United States Patent
Huang et al.

(10) Patent No.: US 7,113,342 B2
(45) Date of Patent: Sep. 26, 2006

(54) COMPOSITE STRUCTURE FOR LIGHT DIFFUSION

(75) Inventors: Pin-Chien Huang, Taipei (TW); Ta-Ching Pong, Taipei (TW)

(73) Assignee: Pong & Huang International Co., Ltd., Taipei (TW)

( * ) Notice: Subject to any disclaimer, the term of this patent is extended or adjusted under 35 U.S.C. 154(b) by 0 days.

(21) Appl. No.: 11/063,754

(22) Filed: Feb. 24, 2005

(65) Prior Publication Data

US 2006/0187552 A1    Aug. 24, 2006

(51) Int. Cl.
*G02B 27/10*    (2006.01)
(52) U.S. Cl. ...................... 359/619; 359/625
(58) Field of Classification Search ........ 359/619–623, 359/625, 577, 581, 707
See application file for complete search history.

(56) References Cited

U.S. PATENT DOCUMENTS 6,275,338 B1 *  8/2001  Arai et al. .................. 359/707
6,396,634 B1 *  5/2002  Ishikawa et al. ............ 359/707
2003/0214615 A1 * 11/2003  Colgan et al. ................ 349/65
2005/0122591 A1 *  6/2005  Parker et al. ............... 359/619

FOREIGN PATENT DOCUMENTS

JP         6-18707     *   1/1994

* cited by examiner

*Primary Examiner*—Alicia M Harrington
(74) *Attorney, Agent, or Firm*—Rosenberg, Klein & Lee

(57) ABSTRACT

The present invention disclose a composite structure for light diffusion, including at least one carrier media layer and a microlens system comprising a plurality of microlenses thereon. A transparent material for enlarging the shape is coated on each microlens to cover the gaps between the microlens. Partial surface of the transparent material can be coated a light absorbing layer for glare reduction. Besides, the microlens can be or asymmetric or arranged in random, non-periodic array for interference reduction.

34 Claims, 15 Drawing Sheets

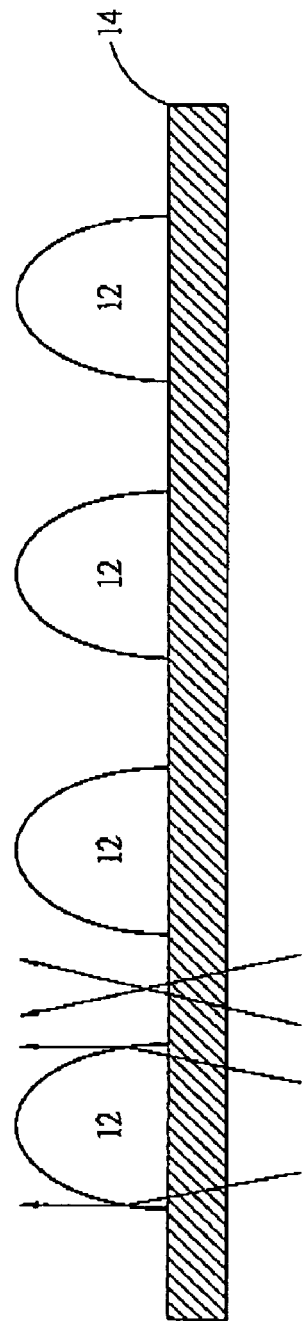
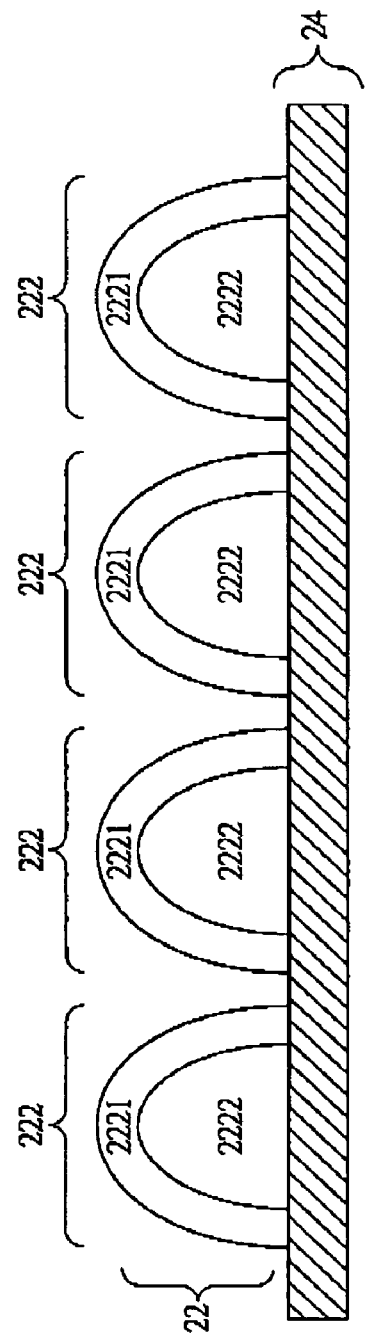

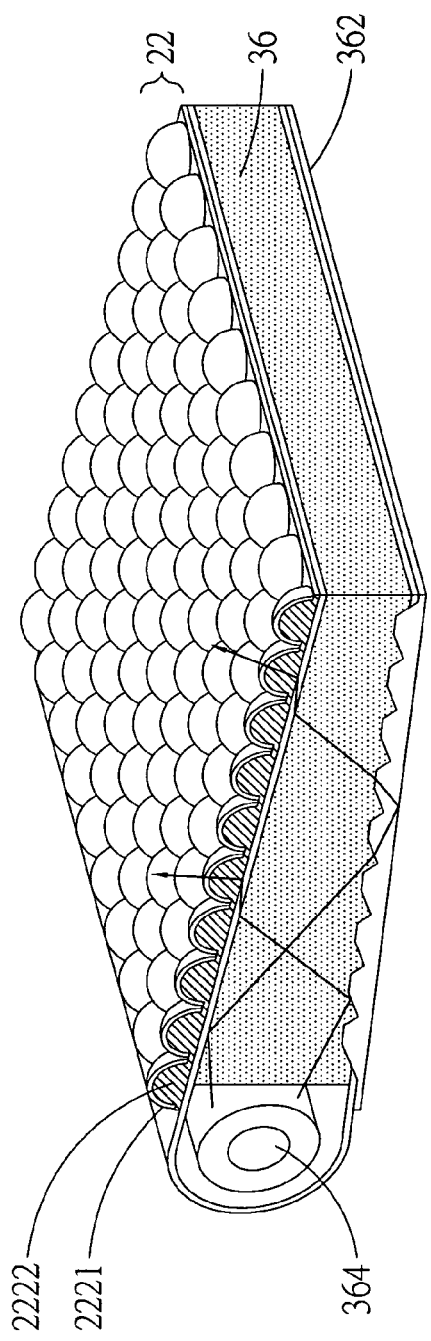
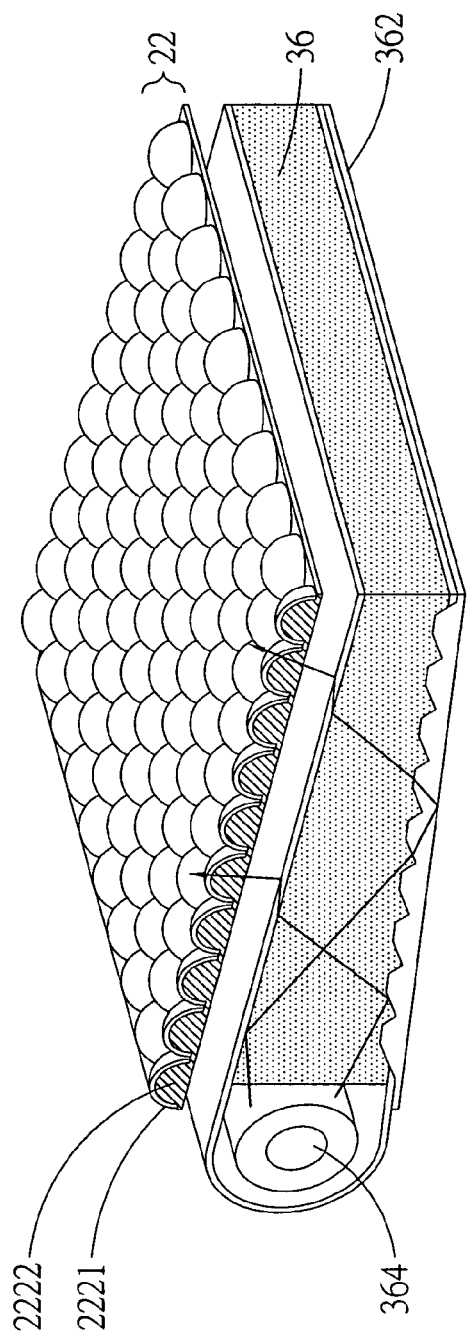
FIG.7A
FIG.7B

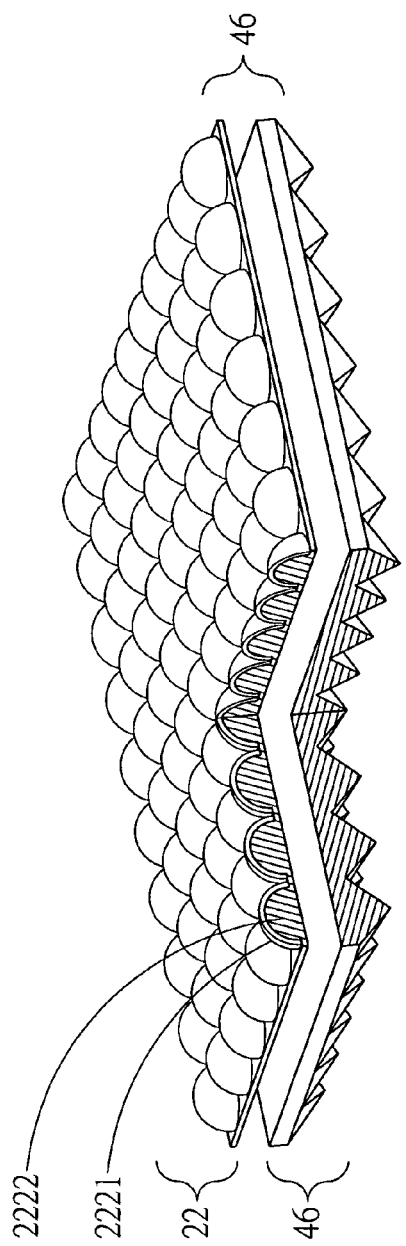
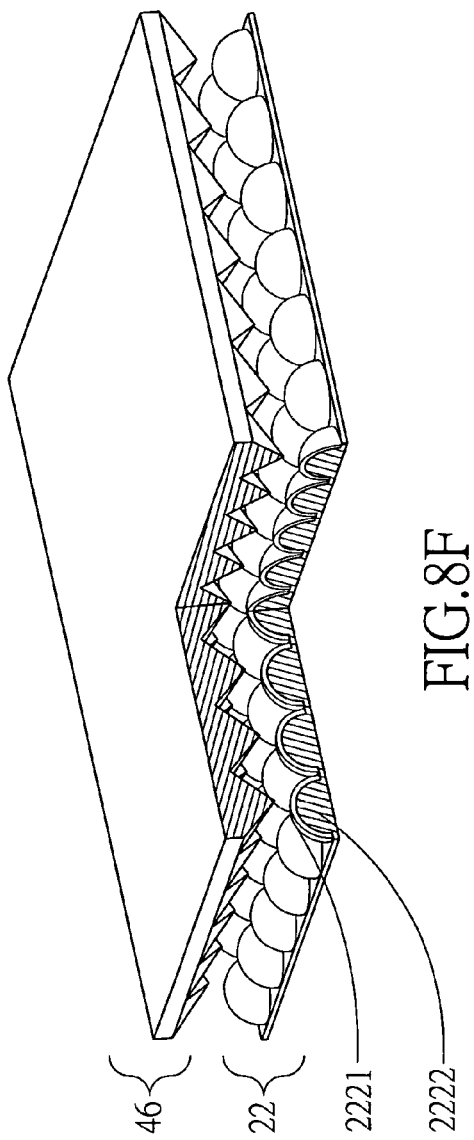
FIG.8E
FIG.8F

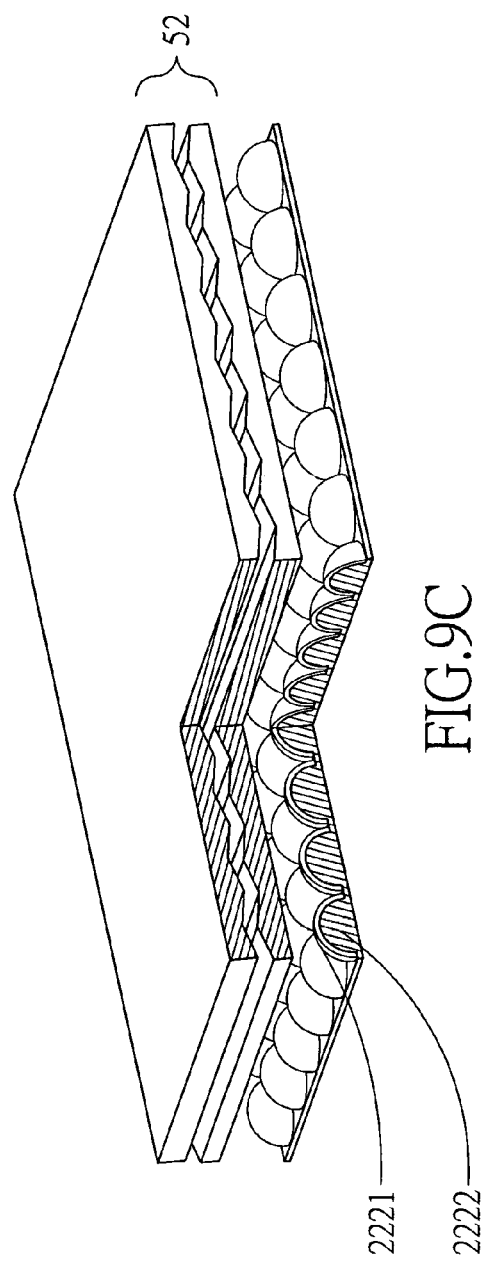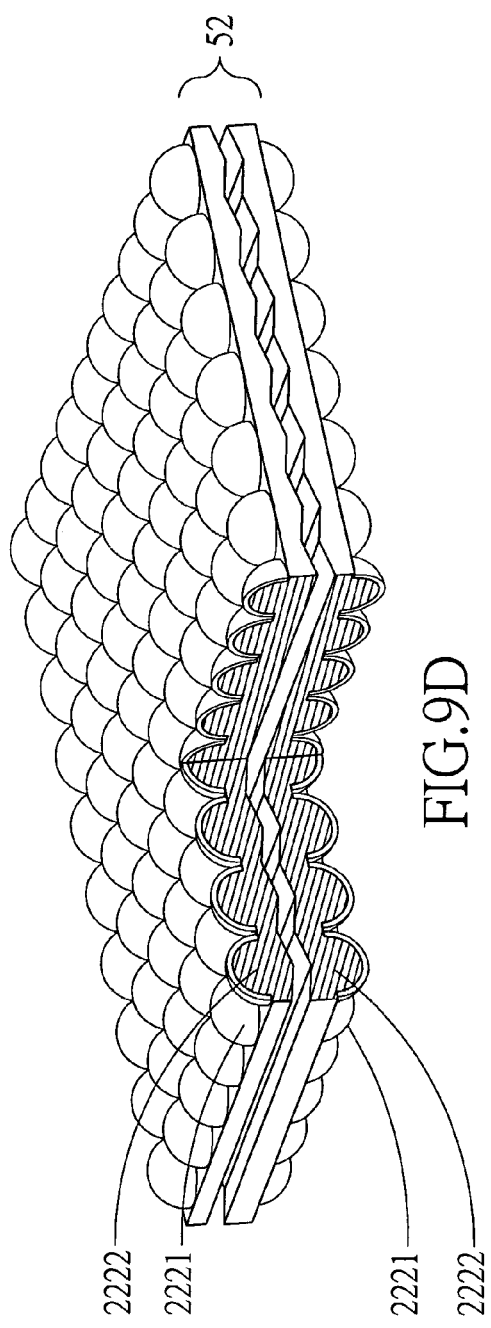

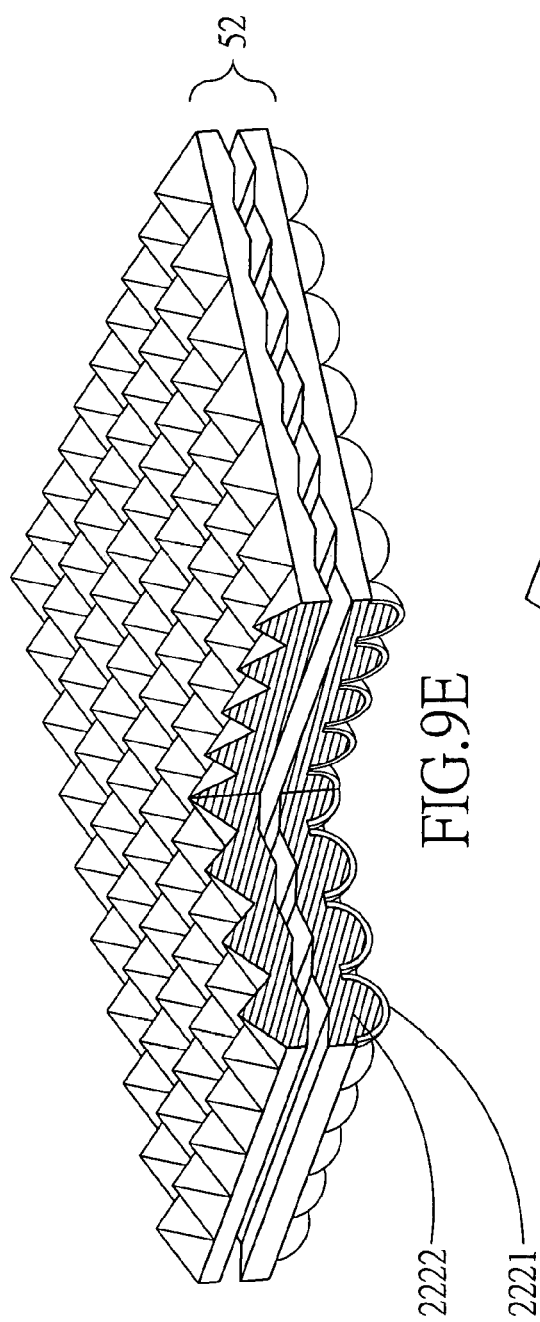
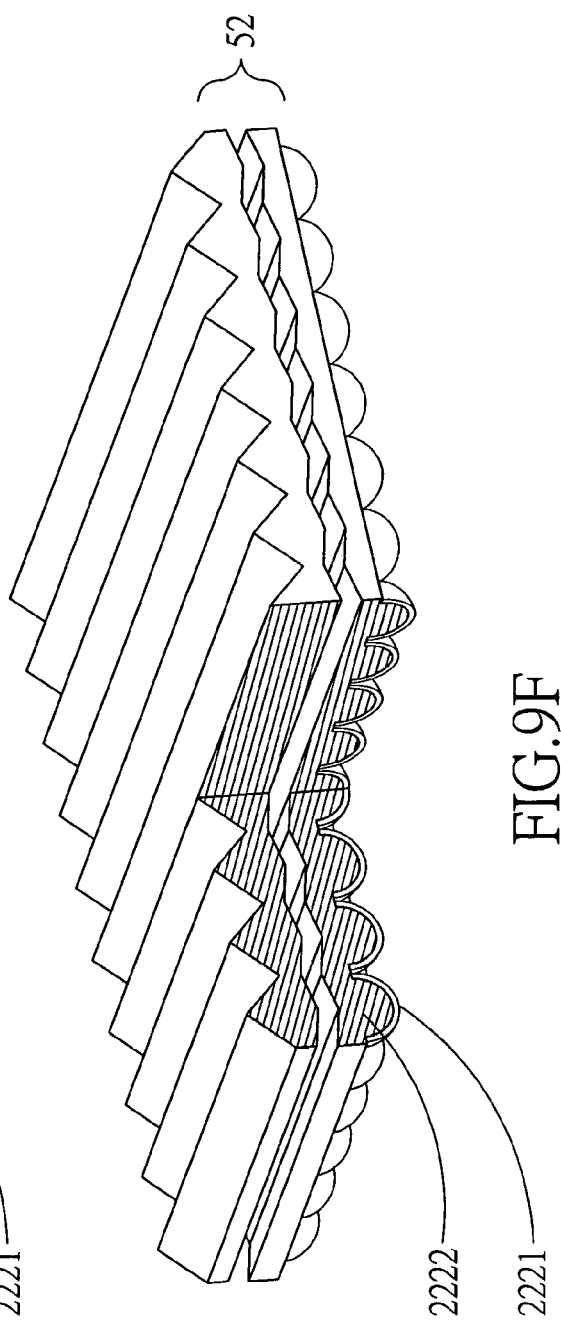

COMPOSITE STRUCTURE FOR LIGHT DIFFUSION

BACKGROUND OF THE INVENTION

1. Field of the Invention

The present invention generally relates to a composite structure for light diffusion, and more particularly to a composite structure having improved physical strength and/or light utilization and/or glare reduction for light path modification.

2. Description of the Prior Art

Nowadays the technologies for displaying images, especially applying to the display devices of the portable electronic equipments having low power consumption, are used regularly. Liquid Crystal Display (LCD) is one of the major technologies used in these display devices and an external lighting is necessary thereof. In these portable electrical equipments, batteries are used as the only power source, thus how to enhance the light utilization efficiency becomes important.

For the reason, many techniques for increasing light utilization efficiency are used in LCD display device. As indicated in FIGS. 1A and 1B, a variety of optical materials and structures are typically used in order to improve the overall optical performance of an LCD display device. The light guide includes a miniature fluorescent lamp and reflector. The light from the lamp is totally internal reflected in the light guide before it is reflected by the dots for extracting light from the light guide on the reflecting material. The light from the light guide may then pass through several diffusing materials or light path modifying materials. The light path modifying materials may comprise light diffusion material, prism array, polarizing plate, polarization conversion layer and the like.

The techniques are not only applied in portable electrical equipments but also put in use to image projectors. Some of the most recent developments include DMD (Digital Mirror Device, from Texas Instruments) projectors and LCD projectors. A screen is used to be a media for projecting the final images from these projectors to the viewer. Depending on the viewer's environment and the projection principle used, the screen can either be a "front projection" or "rear projection" type.

Microlens are also widely used in displaying and projection. Reference is now made in FIG. 3, the microlens 12 arranged as an array on a carrier media are illustrated 14. The microlens are fabricated by the molding tool. Considering the difficulty in fabrication process, there are gaps between microlens for decreasing the fault resulted from mold releasing, whereby the light utilization efficiency on the gaps is ignored. Thus more light utilization efficiency can be gained by well using the light on the gaps.

SUMMARY OF THE INVENTION

Considering the difficulty and cost in fabrication process, many kinds of microlens system have gaps between microlens, thus the light utilization efficiency on gaps is ignored. For increasing the light utilization efficiency, one objective of the present invention is to provide a transparent layer for enlarging the sharp of microlens to cover the gaps, whereby light utilization efficiency on gaps can be raised.

Another objective of the present invention is to provide a light absorbing layer covering on gaps and partial surface of microlens for glare reduction.

Accordingly, the present invention disclose a composite structure for light diffusion, including at least one carrier media layer and a microlens system comprising a plurality of microlenses thereon. A transparent material for enlarging the shape is coated on each microlens to cover the gaps between the microlens. Partial surface of the transparent material can be coated a light absorbing layer for glare reduction. Besides, the microlens can be or asymmetric or arranged in random, non-periodic array for interference reduction.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 shows a diagram representing a microlens system in accordance with the prior art;

FIGS. 4, 5, and 6 show the diagrams representing the microlens systems in accordance with one embodiment of the present invention;

FIG. 7A and FIG. 7B show the diagrams representing the composite structure for light diffusion attached to a light guide in accordance with one embodiment of the present invention;

FIGS. 8A to 8F show the diagrams representing the composite structure for light diffusion attached to prism arrays in accordance with one embodiment of the present invention;

FIGS. 9A to 9F shows show the diagrams representing the composite structure for light diffusion attached to a polarization conversion layer in accordance with one embodiment of the present invention;

DESCRIPTION OF THE PREFERRED EMBODIMENT(S)

Figure 1:
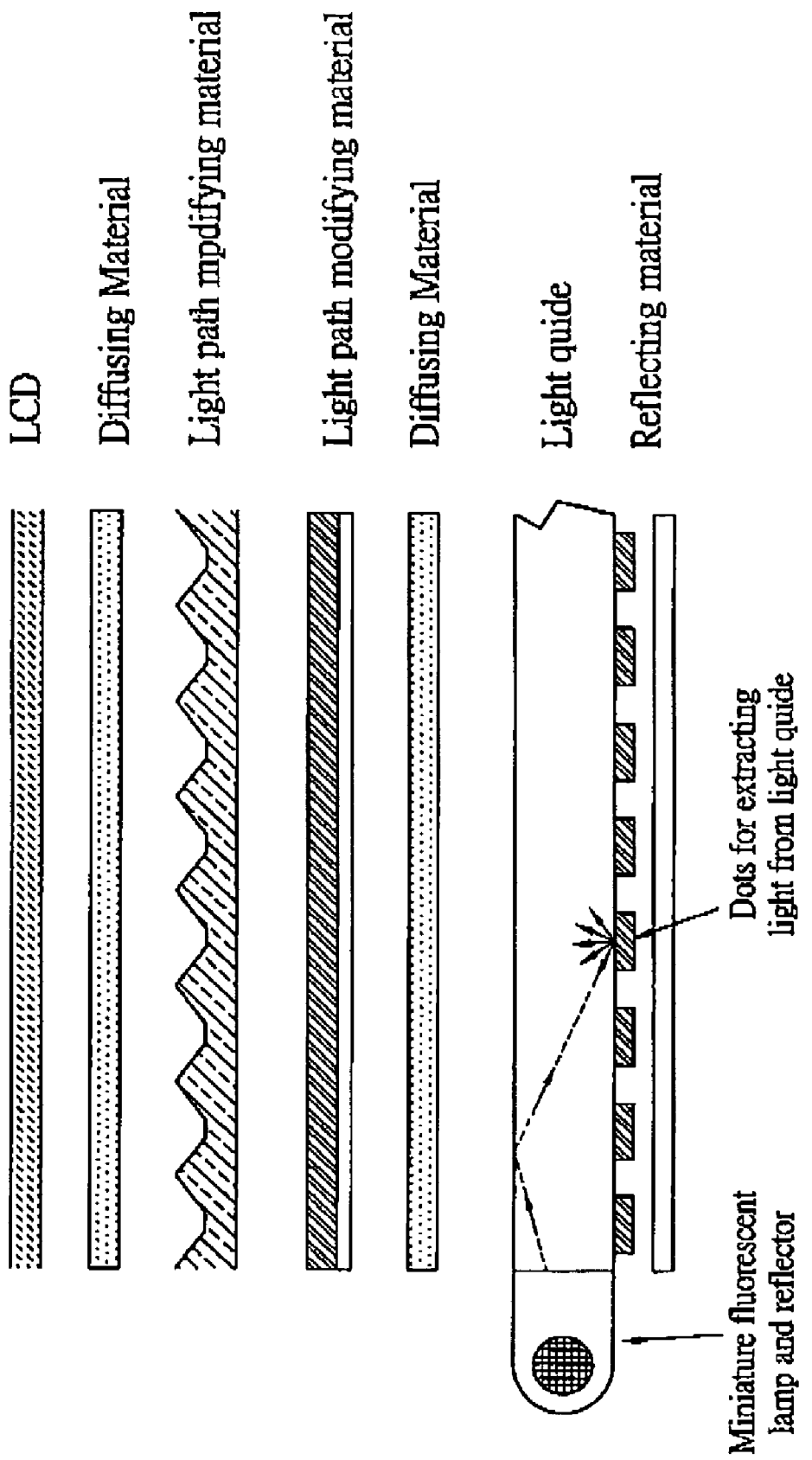
FIG. 1 and FIG. 2 shows a structure of a liquid crystal display panel.
Figure 2:
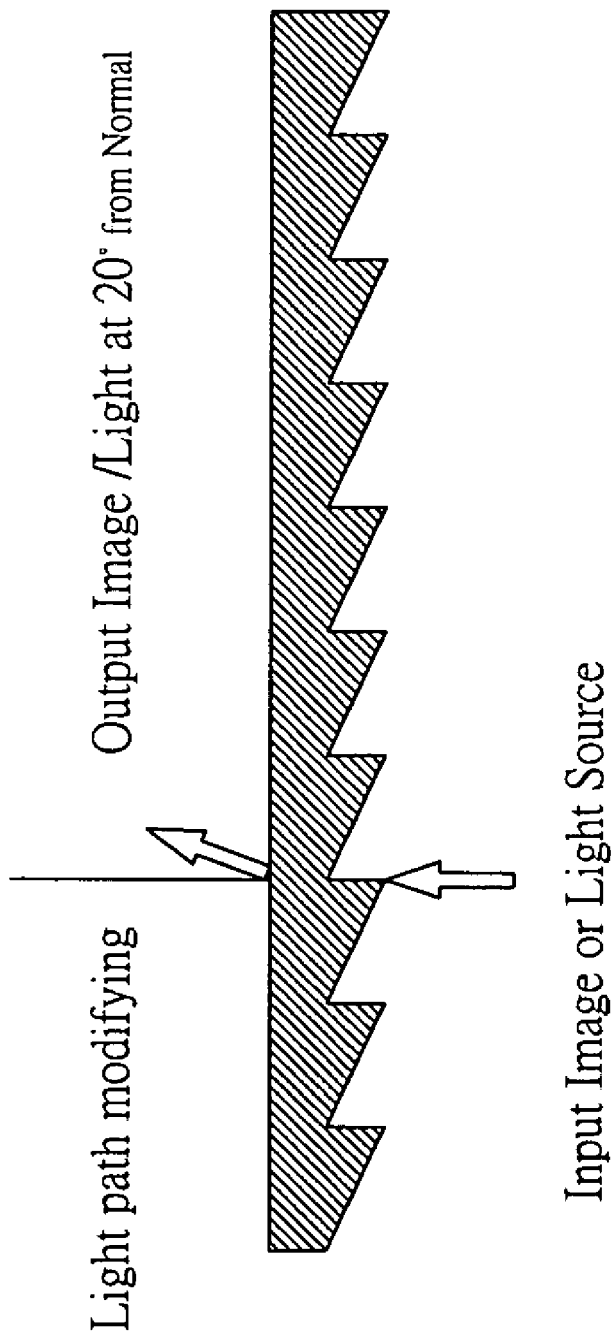

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

The arrangement of a microlens array generally exists gaps in the consideration to the difficulty in fabrication, thus the utilization efficient of the light incident on the gaps is low. The present invention coats a transparent material for enlarging the shape of the microlens to cover the gaps around the microlens, whereby the light utilization efficient raises.

Reference is now made to FIG. 4, which illustrates a composite structure for light diffusion in the first embodiment of the present invention. The composite structure for light diffusion includes mircrolens systems 22 and at least one carrier media layer for carrying the microlens systems 24. The microlens system 22 includes a plurality of microlenses 222, wherein each microlens is constructed by a first layer 2221 with a first refractive index and a second layer 2222 with a second refractive index. The microlens can be formed by the first layer 2221, the second layer 2222, . . . , and the n-th layer. That is, the number of layers can be more than two; the present invention does not limit it. The refractive index of each layer can be different or the same. The first layer 2221 and the second layer 2222 in the present embodiment are used to illustrate that a plurality layers can be comprised in a microlens, but not to limit the present embodiment. The microlens systems 22, having predetermined physical and optical characteristics, are configured on the carrier media layers 24. The microlens systems control paths of light incident on them in accordance with the predetermined physical and optical characteristics, thereby the microlens systems and carrier media layers form a light diffusion screen with light guiding properties.

Figure 5:
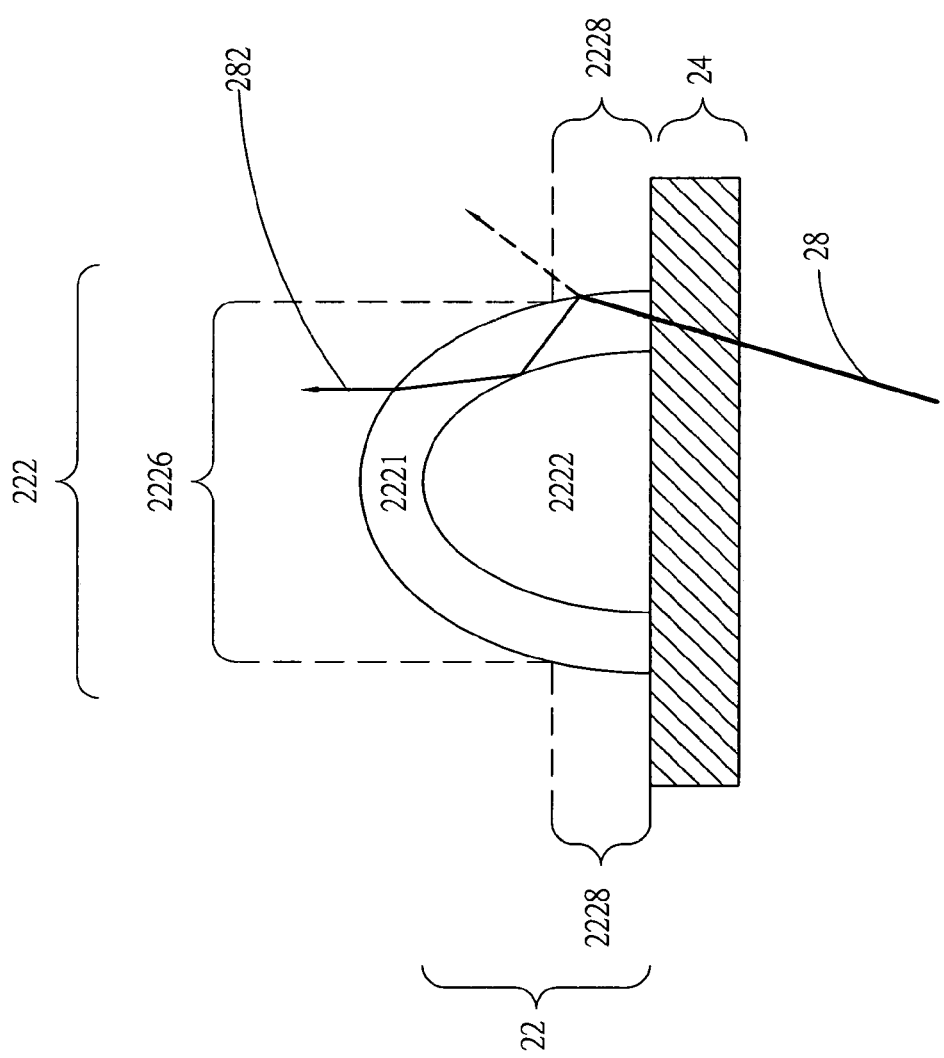

The second layer can be formed by a durable material for decreasing or preventing the damage from abrasion. The first refractive index may be larger or smaller than the second refractive index for providing different predetermined physical and optical characteristics, wherein the physical characteristics include refractive index, radius, size, array pitch, profile property, optical axis inclination and degree of symmetry. Referring is now made to FIG. 5, partial light 282 incident on the first layer 2221 is emitted from the first layer 2221 after 2 times reflection when the first refractive index is smaller than the second refractive index. Thus the light 28 incident on the first layer 2221 around the second layer 2222 can be controlled to centralize toward the optic axis of the microlens 222.

The carrier media layer 24 above mentioned can be transparent or opaque. Besides, separate microlens systems 22 can be attached to separate carrier media layers 24, and then the separate microlens systems 22 can be attached to the front surface and the back surface of a supporting materials. Accordingly, the whole microlens system 22 can be, not limited to, plano-concave lens system, plano-convex lens systems, concave—concave microlens systems, convex-concave microlens systems, or convex—convex microlens systems. Moreover, each micro len 222 can include one or many light dispersers, such as light diffusing particles or other types of bulk diffuser, the light dispersers can be isotropic dispersers or anti-isotropic dispersers. Therefore, microlenses of a microlens system 22 can be arranged in periodic arrays or in random, non-periodic arrays. Besides, the microlens system 22 can be symmetric or asymmetric in shape. The microlens 222 is concave with respect to a base image source, wherein the base image source can be one of geometrical patterns, comprising: triangle, rectangle, polygon, circle, ellipse, or the like. An array arranged very regularly or periodically could suffer the streaks caused by the light interference on the screen, thus a suitable choice of irregular arrangement or primitives of microlenses 222 will reduce the effect of light interference.

Figure 6:
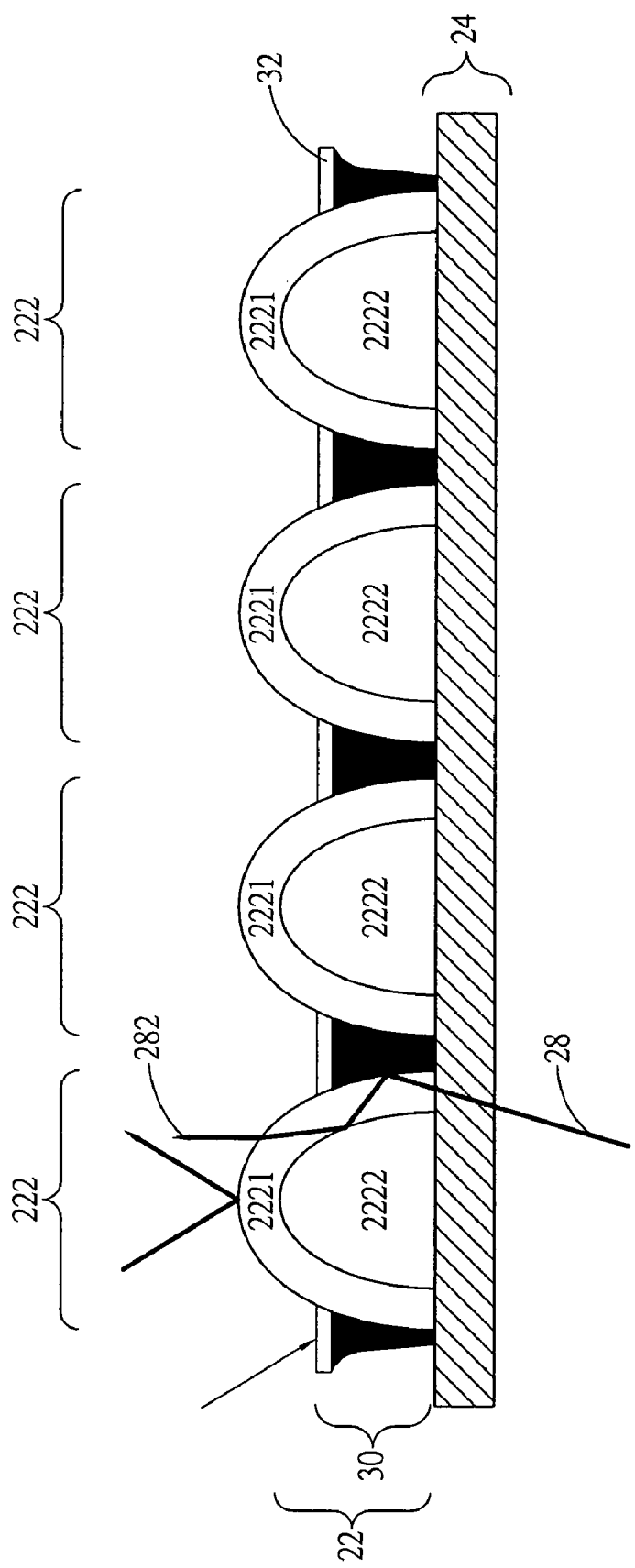

Referring is now made to FIG. 6, which illustrates a composite structure for light diffusion in one embodiment of the present invention. The surface of the microlens 222 can be further separated into a first surface 2226 and a second surface 2228. The second surface 2228 is between the first surface 2226 and the carrier media layer 24. The second surface can be coated with a reflective material to be a reflective layer for totally reflecting the light, whereby the light incident 28 on the first layer 2222 is reflected at the second surface 2228 and the surface of the second layer 2224 successively if the first refraction rate is smaller the second refraction rate. Accordingly the light incident on the first layer can be centralized toward the optic axis of the microlens 222 and then be diffused for enhancing light utilization efficiency.

The second layer 2224 can be an original macro lens of a micro lens system, and the first layer 2222 can be a transparent material for enlarging the shape of the second layer 2224. The first layer 2222 covers the second layer 2224 and partial gaps around the second layer 2224, thus the light incident on the partial gaps covered by the first layer 2222 can be fully utilized.

The surface of the first layer 2221 can be a light dispersing surface. Besides, the first layer 2221 can be a durable material for resisting abrasion. The second surface can be further coated a light absorbing material to be a light absorbing layer for decreasing the reflection of the external light on the surface of the first layer 2221. Alternatively, an additional shelter layer 30 can be coated on the second surface 2228 and gaps. The shelter layer 30 can be an opaque material or light reflective material. Besides, a light absorbing material 32 can be coated on the shelter layer 30 for glare reduction.

Moreover, one embodiment of the present invention is to provide the composite structure for light diffusion on a light guide, referring to FIGS. 7A and 7B. In the prior art, a diffusion material can be provide on the light guide 36 for diffusing the incident light into light path modifying material. The diffusion material can be built on the light guide or there is a determined distance between the diffusion material and the light guide. The light guide 36 includes a miniature fluorescent lamp 34 and reflector 32. The light from the lamp 364 is emitted into the light guide and then emitted from the light guide 36 by the reflection on the reflector 362. The diffusion material can be the above described composite structure 22 with the first layer 2221 and the second layer 2222 for light diffusion. The light emitted from the light guide is diffused by the microlens system 22, the composite structure 22 with the first layer 2221 and the second layer 2222 for light diffusion.

Figure 8A:
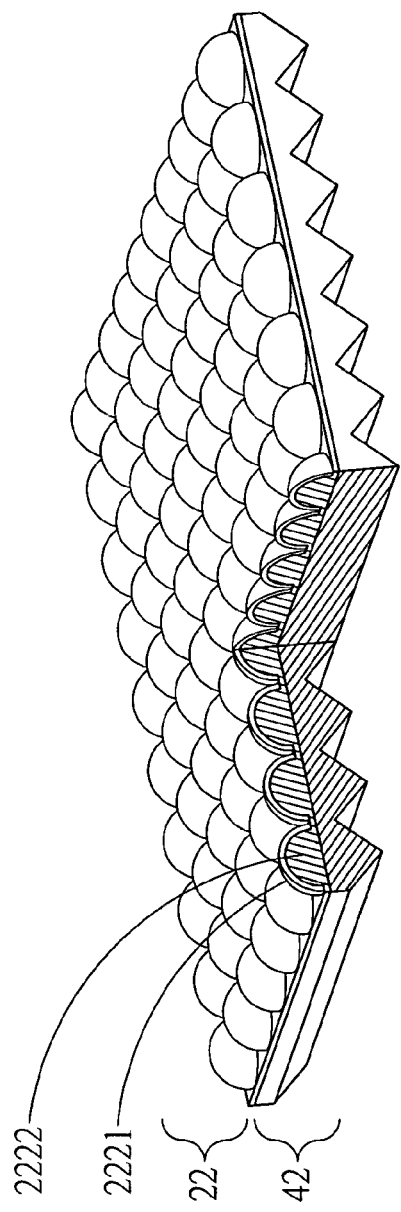
Figure 8B:
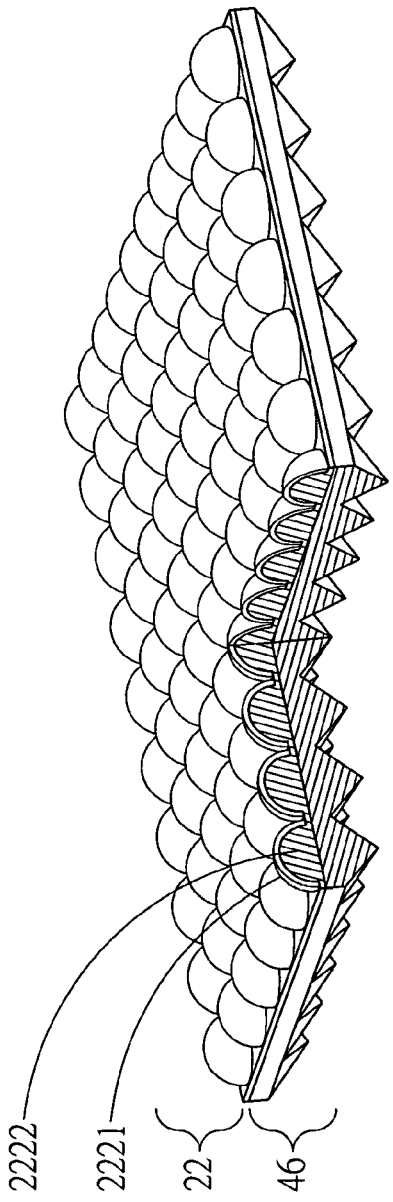
Figure 8C:
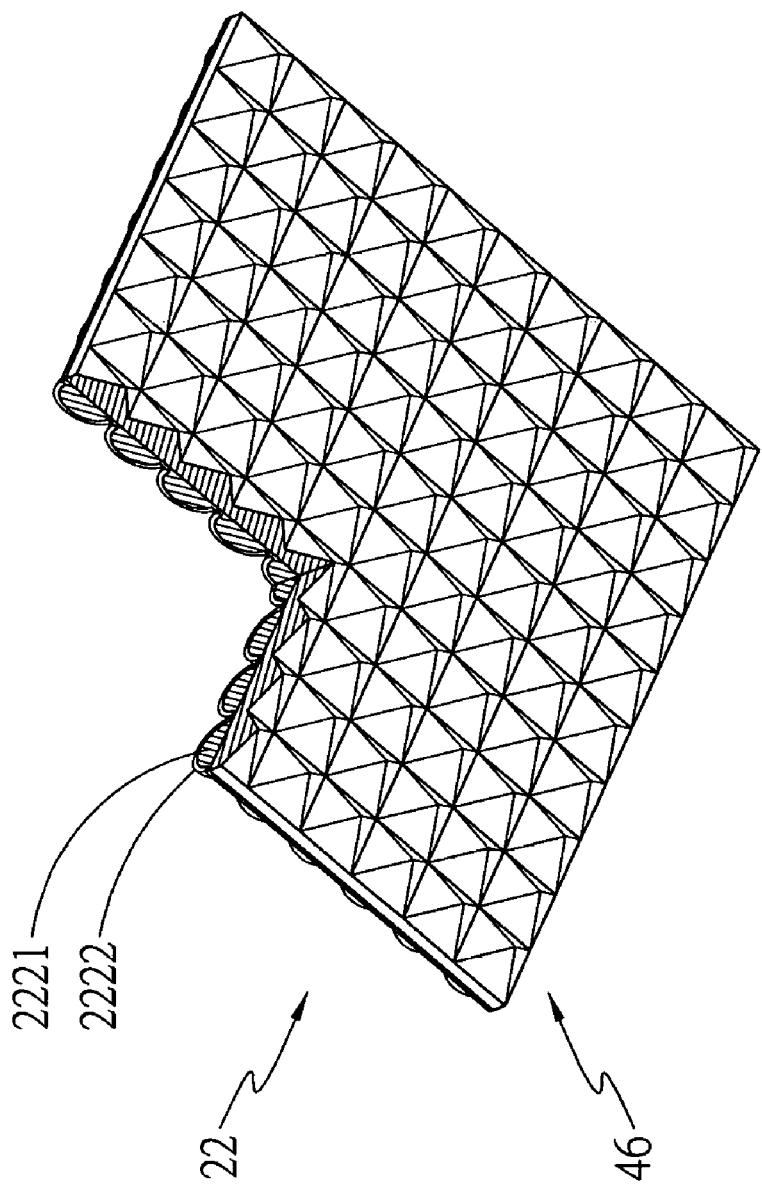
Figure 8D:
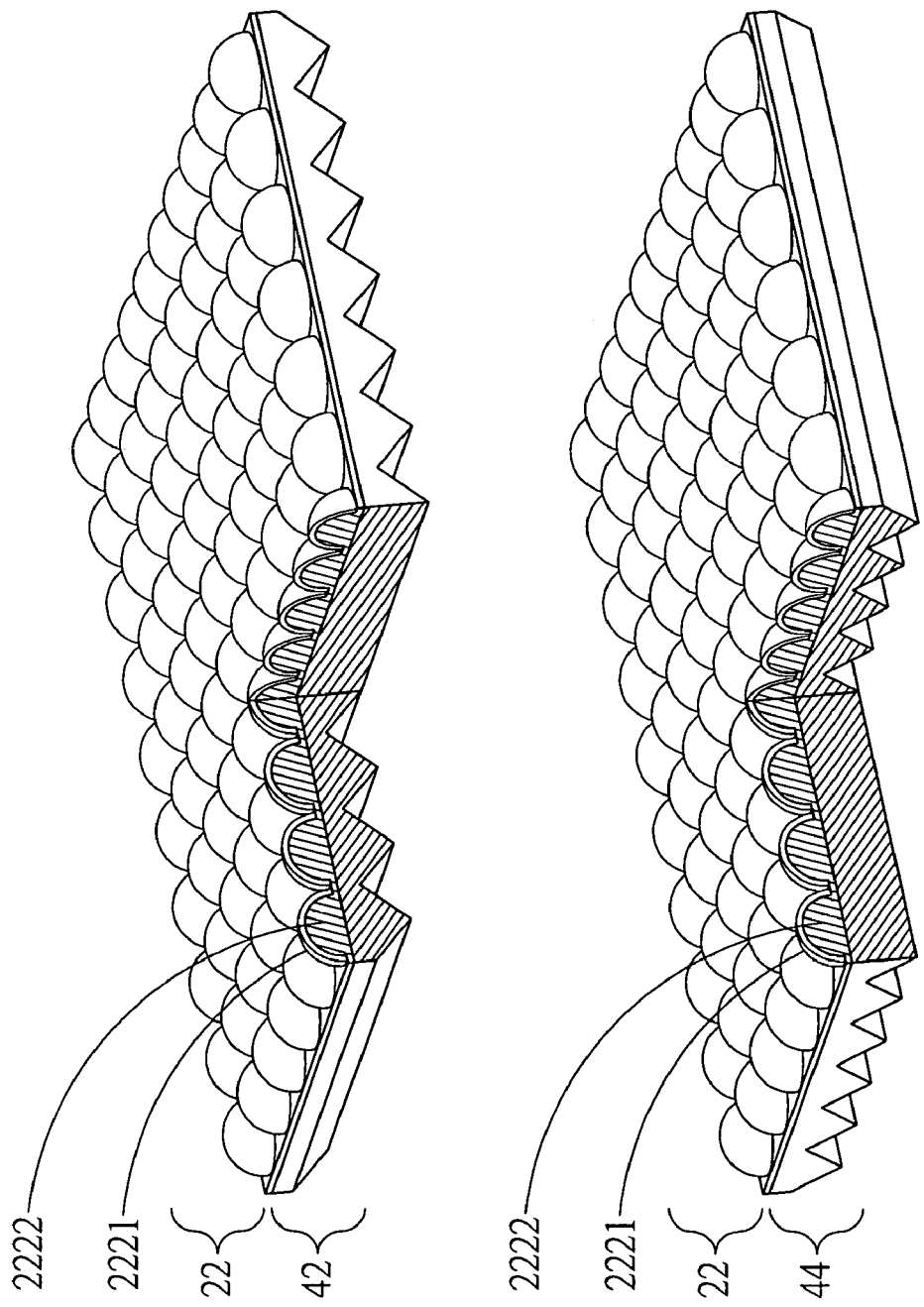

In addition, one embodiment of the present invention is to attach the composite structure for light diffusion to the prism array, referring to FIGS. 8A, 8B, 8C and 8D. The prism array is one of the light path control materials, which comprises a plurality of prisms. FIGS. 8A and 8B illustrates a prism array 42 and the composite structure 22 with the first layer 2221 and the second layer 2222. The range of suitable apex angle of each prism can be wider for providing the same or better light utilization efficiency after a suitable choice of the composite structure 22 is attached to the prism array 42. FIG. 8D illustrates another application having two prism arrays 42, 44 which are perpendicular to one another, wherein each of them is attached to the foregoing composite structure 22 with the first layer 2221 and the second layer 2222. The prism array can also be a pyramid array 46 attached to the forgoing composite structure 22 with the first layer 2221 and the second layer 2222 for light diffusion, referring to FIG. 8C. Besides, the composite structure 22 can be configured above or below the prism arrays 42 and there is a distance between them, referring to 8E and 8F. Moreover, the the surface of microlens systems 22 can face or opposite to the prism arrays 42.

Figure 9A:
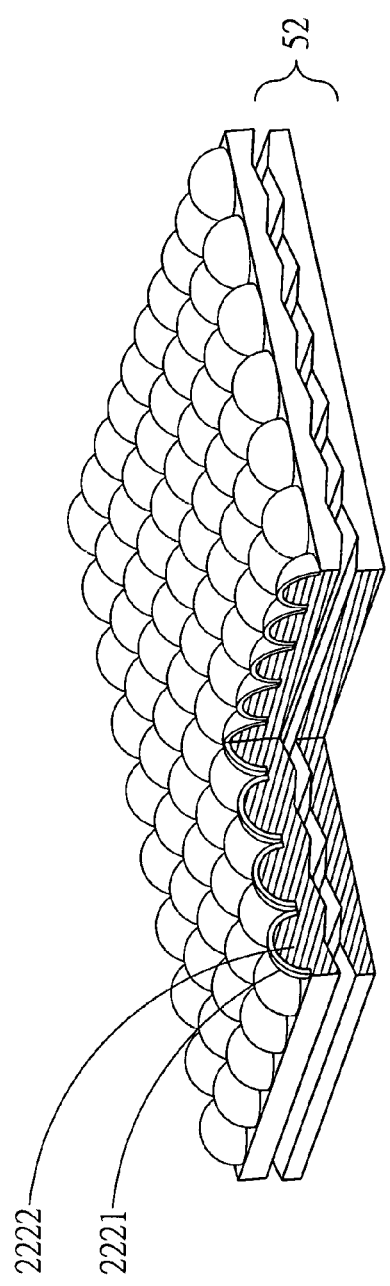
Figure 9B:
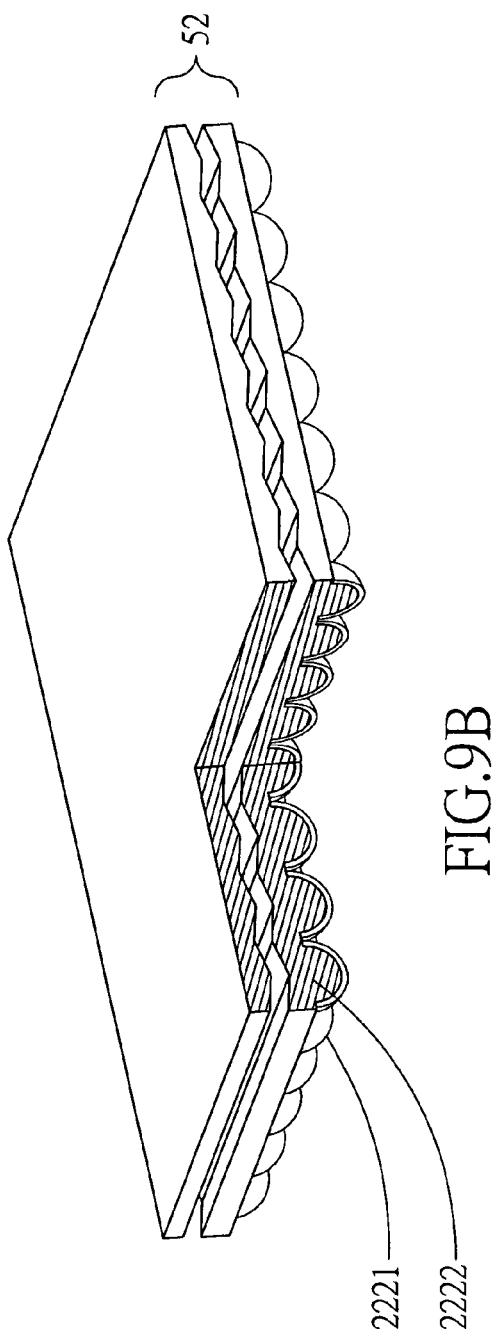

Furthermore, one embodiment of the present invention is to provide the above described composite structure 22 with the first layer 2221 and the second layer 2222 for light diffusion on a polarization conversion layer 52, referring to FIG. 9A. In the prior art, one of the light path modifying materials can be a polarization conversion layer 52, and a diffusing material is usually provided on the polarization conversion layer 52 for enhancing the light utilization efficiency. In the embodiment, the above described composite structure 22 with the first layer 2221 and the second layer 2222 for light diffusion is applied to be the diffusing material provided on the polarization conversion layer 52.

The microlens system 42 can be formed on the polarization conversion layer 52 or configured above or below the polarization conversion layer 52, referring to FIG. 9A, 9B, 9C and 9D. There may be a space between the polarization conversion layer 52 and the microlens system 42. Moreover, the microlens system 42 can face the polarization conversion layer 52 or not, referring 9E.

Figure 10A:
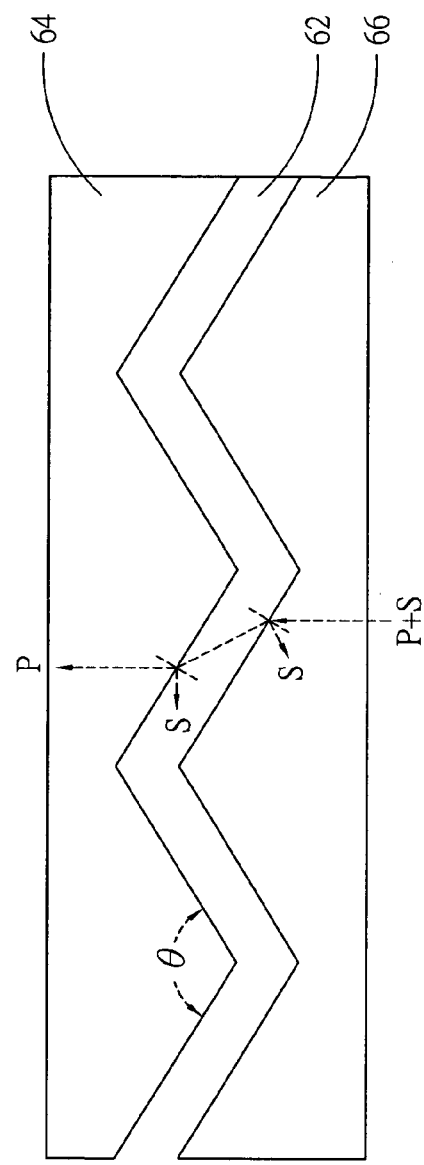
FIG. 10A and FIG. 10B illustrate cross-sectional views of the polarization conversion layer in accordance with one embodiment of the present invention.
Figure 10B:
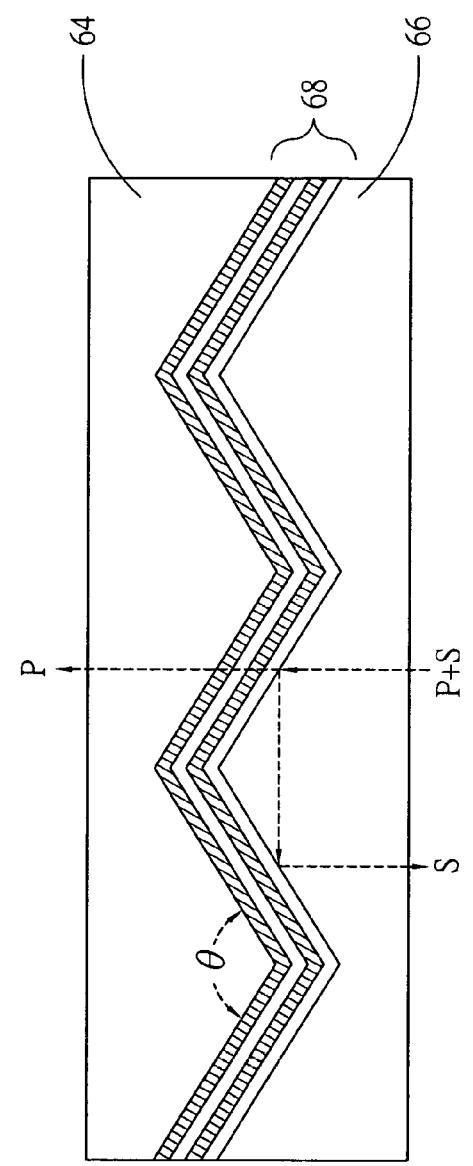

Besides, prism array 42 can be formed on the polarization conversion layer 52 also, referring to FIGS. 9E and 9F. The polarization conversion layer 52 may formed by two aligned polarizing layers. There is a space between forgoing two aligned polarizing layers. Referring to FIG. 10A and FIG. 10B, the space can be empty or stacked one of a plurality of transparent materials with different incident indexes. That is, the polarization conversion layer 52 can be two parallel polarizing plates, a retroreflecting plate having two parallel polarizing plates and at two stacks with different incident indexes between the parallel polarizing plates, or the like. The present invention does not limit the structure or the materials of the polarization conversion layer 52. The refractive indexes of the upper polarizing layer 62, the space 64, and the lower polarizing layer 66 are n1, n0, n1. Besides, the Brewster angle can be determined by the following formula: $\theta=\sin^{-1}(n1^2/(n0^2+n1^2))^{1/2}$. Accordingly, when incident light with S wave and p wave pass through the polarization conversion layer 52, only the P wave will pass.

Figure 11A:
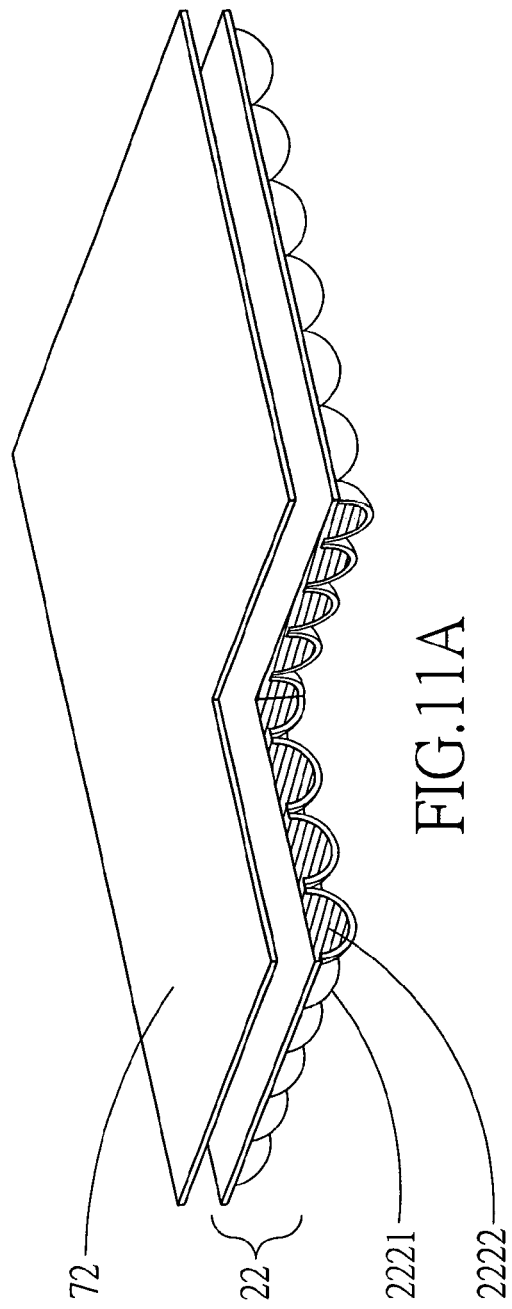
FIG. 11A and FIG. 11B show the diagrams representing the composite structure for light diffusion attached to a polarizing plate in accordance with one embodiment of the present invention.
Figure 11B:
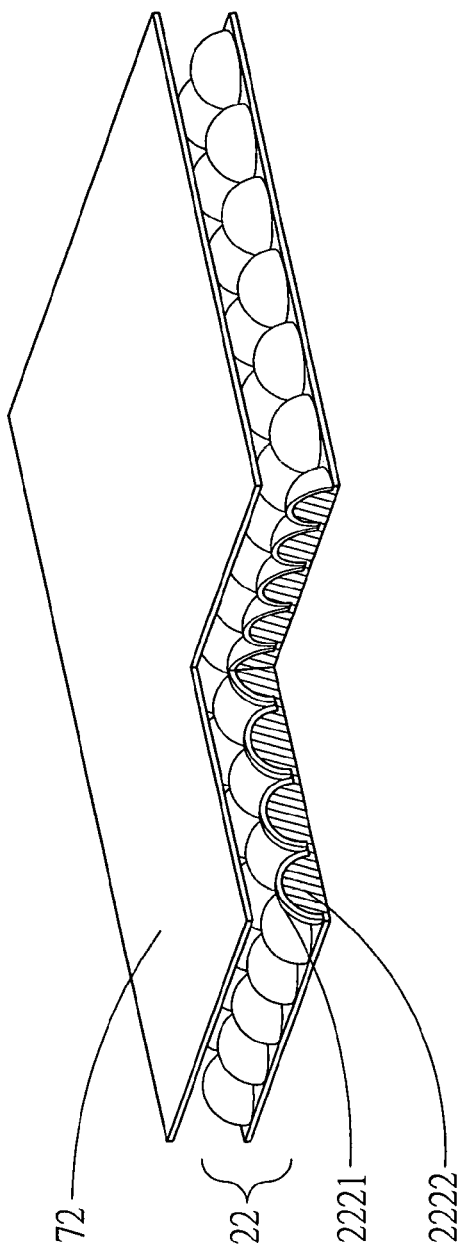

Furthermore, one embodiment of the present invention is to provide the above described composite structure 22 with the first layer 2221 and the second layer 2222 for light diffusion for configuring with a polarizing plate 72, referring to FIG. 11A and FIG. 11B. The composite structure 22 can be attached to the polarizing plate 72 or configured with the polarizing plate 72. Besides, there can be a space between the composite structure 22 and the polarizing plate 72. Moreover, the surface of the micro lens may face the polarizing plate 72.

The microlens system applied in the present invention is not limited to the microlens array with gaps between the microlenses, the microlens system can also be a mircolens array without gaps between microlenses.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

What is claimed is:

1. A composite structure for light diffusion, wherein said composite structure for light path modification includes:
   microlens systems, said microlens systems includes a plurality of microlenses, each of said microlenses is formed with a first layer with a first refractive index and a second layer with a second refractive index, wherein said first refractive index is smaller than said second refractive index; and
   at least one carrier media layer suitable for carrying the microlens systems, wherein said second layer covers said first layer;
   wherein said plurality of optical microlens systems having predetermined physical and optical characteristics including light diffusion characteristics, wherein said optical microlens systems are attached to said carrier media layers, wherein said plurality of optical microlens system control paths of light incident on said optical microlens system in accordance with said optical and physical characteristics such that fields of light are provided, and wherein said microlens systems and carrier media layers thereby form a light path modification media with light guiding properties.

2. The composite structure for light diffusion of claim 1, wherein said physical characteristics include refractive index, radius, size, array pitch, profile property, optical axis inclination and degree of symmetry.

3. The composite structure for light diffusion of claim 1, wherein said carrier media layer is transparent.

4. The composite structure for light diffusion of claim 1, wherein said microlens contains at least one isotropic light disperser.

5. The composite structure for light diffusion of claim 1, wherein said microlens contains at least one anti-isotropic light disperser.

6. The composite structure for light diffusion of claim 1, wherein said microlens systems include light dispersing surfaces.

7. The composite structure for light diffusion of claim 1, wherein said microlens systems are arranged in periodic arrays.

8. The composite structure for light diffusion of claim 1, wherein said microlens system are arranged in random, non-periodic arrays.

9. The composite structure for light diffusion of claim 1, wherein said microlens system are concave with respect to a base image source, wherein said base image source include at least one kind of geometric primitives.

10. The composite structure for light diffusion of claim 1, wherein said microlens systems are chosen from the group of following: plano-concave lens system, plano-convex lens systems, concave—concave lens systems, convex—convex lens systems, and concave-convex lens systems.

11. The composite structure for light diffusion of claim 1, wherein said microlens include a first surface and a second surface, wherein said second surface is between the first surface and said carrier media layer and coated with a light reflecting material.

12. The composite structure for light diffusion of claim 11, wherein said light reflecting material is coated with a light absorbing material.

13. The composite structure for light diffusion of claim 11, further comprising a light sheltering layer on all of said second surface.

14. The composite structure for light diffusion of claim 11, wherein the first layer and the second layer are a durable material for resisting abrasion.

15. The composite structure for light diffusion of claim 1, wherein said carrier media layer is a light guide.

16. The composite structure for light diffusion of claim 1, wherein said carrier media layer comprises a prism array on a surface opposite to another surface carrying said microlens systems.

17. The composite structure for light diffusion of claim 1, wherein said carrier media layer is a polarizing conversion layer.

18. The composite structure for light diffusion of claim 17, wherein said microlens systems is carried on both surface of said polarizing conversion layer.

19. The composite structure for light diffusion of claim 17, wherein said polarizing conversion layer is formed by two polarizing plates, wherein each polarizing conversion layer has a structure surface and the structure surfaces is face to face.

20. The composite structure for light diffusion of claim 19, wherein said polarizing conversion layer is a retroreflecting polarizer with at least two transparent materials with different incident indexes stacked between said polarizing plates.

21. The composite structure for light diffusion of claim 1, wherein said carrier media layer is a polarizing plate.

22. The composite structure for light diffusion of claim 1, wherein said carrier media layer is configured with a light guide, wherein there is a space between said carrier media layer and said light guide.

23. The composite structure for light diffusion of claim 1, wherein said carrier media layer is configured above a prism array, wherein there is a space between said carrier media layer and said prism array.

24. The composite structure for light diffusion of claim 23, wherein the prism array and said microlens system are configured face to face.

25. The composite structure for light diffusion of claim 23, wherein the prism array and said microlens system are configured back to back.

26. The composite structure for light diffusion of claim 1, wherein said carrier media layer is configured with a polarizing conversion layer, wherein there is a space between said carrier media layer and said polarizing conversion layer.

27. The composite structure for light diffusion of claim 26, wherein said microlens system is toward said polarizing conversion layer.

28. The composite structure for light diffusion of claim 26, wherein said polarizing conversion layer is formed by two polarizing plates, wherein each polarizing conversion layer has a structure surface and the structure surfaces is face to face.

29. The composite structure for light diffusion of claim 28, wherein said polarizing conversion layer is a retroreflecting polarizer with at least two transparent materials with different incident indexes stacked between said polarizing plates.

30. The composite structure for light diffusion of claim 1, wherein said second material is formed by a durable material.

31. A composite structure for light diffusion, wherein said composite structure for light path modification includes:

microlens systems, said microlens systems includes a plurality of microlenses, each of said microlenses is formed with a first layer with a first refractive index and a second layer with a second refractive index, wherein said microlens include a first surface and a second surface, wherein said second surface is between the first surface and said carrier media layer and coated with a light reflecting material which is coated with a light absorbing material; and at least one carrier media layer suitable for carrying the microlens systems;

wherein said plurality of optical microlens systems having predetermined physical and optical characteristics including light diffusion characteristics, wherein said optical microlens systems are attached to said carrier media layers, wherein said plurality of optical microlens system control paths of light incident on said optical microlens system in accordance with said optical and physical characteristics such that fields of light are provided, and wherein said microlens systems and carrier media layers thereby form a light path modification media with light guiding properties.

32. A composite structure for light diffusion, wherein said composite structure for light path modification includes:

microlens systems, said microlens systems includes a plurality of microlenses, each of said microlenses is formed with a first layer with a first refractive index and a second layer with a second refractive index, wherein said microlens include a first surface and a second surface, wherein said second surface is between the first surface and said carrier media layer and coated with a light reflecting material which is coated with a light absorbing material;

a light sheltering layer on all of said second surface; and at least one carrier media layer suitable for carrying the microlens systems;

wherein said plurality of optical microlens systems having predetermined physical and optical characteristics including light diffusion characteristics, wherein said optical microlens systems are attached to said carrier media layers, wherein said plurality of optical microlens system control paths of light incident on said optical microlens system in accordance with said optical and physical characteristics such that fields of light are provided, and wherein said microlens systems and carrier media layers thereby form a light path modification media with light guiding properties.

33. A composite structure for light diffusion, wherein said composite structure for light path modification includes:

microlens systems, said microlens systems includes a plurality of microlenses, each of said microlenses is formed with a first layer with a first refractive index and a second layer with a second refractive index, wherein said microlens include a first surface and a second surface, wherein said second surface is between the first surface and said carrier media layer and coated with a light reflecting material which is coated with a light absorbing material; and at least one retroreflecting polarizer suitable for carrying the microlens systems, wherein said retroreflecting polarizer has at least two transparent materials with different incident indexes stacked between said polarizing plates;

wherein said plurality of optical microlens systems having predetermined physical and optical characteristics including light diffusion characteristics, wherein said optical microlens systems are attached to said carrier media layers, wherein said plurality of optical microlens system control paths of light incident on said optical microlens system in accordance with said optical and physical characteristics such that fields of light are provided, and wherein said microlens systems and carrier media layers thereby form a light path modification media with light guiding properties.

34. A composite structure for light diffusion, wherein said composite structure for light path modification includes;

microlens systems, said microlens systems includes a plurality of microlenses, each of said microlenses is formed with a first layer with a first refractive index and a second layer with a second refractive index, wherein said microlens include a first surface and a second surface, wherein said second surface is between the first surface and said carrier media layer and coated with a light reflecting material which is coated with a light absorbing material; and at least one carrier media layer suitable for carrying the microlens systems, wherein said carrier media layer is configured with a polarizing conversion layer, wherein there is a space between said carrier media layer and said polarizing conversion layer, wherein said polarizing conversion layer is formed by two polarizing plates, wherein each polarizing conversion layer has a structure surface and the structure surfaces is face to face, wherein said polarizing conversion layer is a retroreflecting polarizer with at least two transparent materials with different incident indexes stacked between said polarizing plates;

wherein said plurality of optical microlens systems having predetermined physical and optical characteristics including light diffusion characteristics, wherein said optical microlens systems are attached to said carrier media layers, wherein said plurality of optical microlens system control paths of light incident on said optical microlens system in accordance with said optical and physical characteristics such that fields of light are provided, and wherein said microlens systems and carrier media layers thereby form a light path modification media with light guiding properties.

* * * * *